United States Patent
Prael et al.

(10) Patent No.: US 9,122,529 B2
(45) Date of Patent: *Sep. 1, 2015

(54) DYNAMIC JOB PROCESSING BASED ON ESTIMATED COMPLETION TIME AND SPECIFIED TOLERANCE TIME

(71) Applicant: SEARCHLITE ADVANCES LLC, San Jose, CA (US)

(72) Inventors: Charles Prael, Mountain View, CA (US); Adrian Tymes, Mountain View, CA (US)

(*) Notice: Subject to any disclaimer, the term of this patent is extended or adjusted under 35 U.S.C. 154(b) by 166 days.

This patent is subject to a terminal disclaimer.

(21) Appl. No.: 13/961,881

(22) Filed: Aug. 7, 2013

(65) Prior Publication Data
US 2014/0040911 A1 Feb. 6, 2014

Related U.S. Application Data

(63) Continuation of application No. 13/078,753, filed on Apr. 1, 2011, now Pat. No. 8,544,017, which is a continuation of application No. 11/450,152, filed on Jun. 9, 2006, now Pat. No. 7,937,705, which is a continuation of application No. 09/910,445, filed on Jul. 20, 2001, now Pat. No. 7,065,764.

(51) Int. Cl.
G06F 9/46 (2006.01)
G06F 9/50 (2006.01)

(52) U.S. Cl.
CPC .............. *G06F 9/50* (2013.01); *G06F 9/5072* (2013.01); *G06F 9/5077* (2013.01); *G06F 2209/5014* (2013.01)

(58) Field of Classification Search
None
See application file for complete search history.

(56) References Cited

U.S. PATENT DOCUMENTS

| | | | |
|---|---|---|---|
| 5,093,912 A | 3/1992 | Dong et al. | |
| 5,103,393 A | 4/1992 | Harris et al. | |
| 5,165,018 A | 11/1992 | Simor | |
| 5,379,428 A | 1/1995 | Belo | |
| 5,542,088 A | 7/1996 | Jennings et al. | |
| 5,561,456 A | 10/1996 | Yu | |
| 5,765,140 A | 6/1998 | Knudson et al. | |
| 5,822,531 A | 10/1998 | Gorczyca et al. | |
| 5,826,082 A | 10/1998 | Bishop et al. | |
| 5,881,284 A | 3/1999 | Kubo | |
| 5,909,544 A | 6/1999 | Anderson, II et al. | |
| 6,097,886 A | 8/2000 | Dave et al. | |
| 6,161,151 A | 12/2000 | Sudhakaran et al. | |
| 6,236,656 B1 | 5/2001 | Westerberg et al. | |
| 6,345,287 B1 | 2/2002 | Fong et al. | |
| 6,460,082 B1 | 10/2002 | Lumelsky et al. | |
| 6,690,649 B1 | 2/2004 | Shimada | |
| 6,782,410 B1 | 8/2004 | Bhagat et al. | |
| 6,847,993 B1 | 1/2005 | Novaes et al. | |

(Continued)

*Primary Examiner* — Tammy Lee

(57) ABSTRACT

The invention provides a system and method for managing clusters of parallel processors for use by groups and individuals requiring supercomputer level computational power. A Beowulf cluster provides supercomputer level processing power. Unlike a traditional Beowulf cluster; however, cluster size in not singular or static. As jobs are received from users/customers, a Resource Management System (RMS) dynamically configures and reconfigures the available nodes in the system into clusters of the appropriate sizes to process the jobs. Depending on the overall size of the system, many users may have simultaneous access to supercomputer level computational processing. Users are preferably billed based on the time for completion with faster times demanding higher fees.

17 Claims, 3 Drawing Sheets

(56) References Cited

U.S. PATENT DOCUMENTS

| | | |
|---|---|---|
| 7,024,671 B2 | 4/2006 | Yamashita |
| 7,133,842 B2 | 11/2006 | Harif |
| 7,509,671 B1 | 3/2009 | Bedell et al. |
| 8,544,017 B1 | 9/2013 | Prael et al. |
| 2001/0036191 A1 | 11/2001 | Borchering |
| 2001/0053223 A1 | 12/2001 | Ishibashi et al. |
| 2002/0075870 A1 | 6/2002 | De Azevedo et al. |
| 2002/0082811 A1 | 6/2002 | Honjas et al. |
| 2002/0165964 A1 | 11/2002 | Chen et al. |
| 2002/0194248 A1 | 12/2002 | Wood et al. |
| 2002/0198968 A1 | 12/2002 | Shirriff |
| 2004/0165964 A1 | 8/2004 | Herb |
| 2004/0193517 A1 | 9/2004 | Abrams |
| 2004/0205414 A1 | 10/2004 | Roselli et al. |

DYNAMIC JOB PROCESSING BASED ON ESTIMATED COMPLETION TIME AND SPECIFIED TOLERANCE TIME

This application claims priority as a continuation of U.S. application Ser. No. 13/078,753, entitled DYNAMIC JOB PROCESSING BASED ON ESTIMATED COMPLETION TIME AND SPECIFIED TOLERANCE TIME, filed Apr. 1, 2011, which is a continuation of U.S. application Ser. No. 11/450,152 (now U.S. Pat. No. 7,937,705), entitled DYNAMIC JOB PROCESSING BASED ON ESTIMATED COMPETITION TIME AND SPECIFIED TOLERANCE TIME, filed Jun. 9, 2006, which is a continuation of U.S. application Ser. No. 09/910,445, (now U.S. Pat. No. 7,065,764), entitled DYNAMIC ALLOCATED CLUSTER SYSTEM, filed Jul. 20, 2001, the contents of each being hereby incorporated by reference.

BACKGROUND OF THE INVENTION

1. Field of the Invention

This invention relates to computer rendering using clustered parallel processors.

2. Related Art

The invention generally relates to the use of a plurality of computers connected in a network to participate in the distributed processing of a computationally complex problem. Many problems are so computationally complex that they require hours of computation by even a very large and fast computer or workstation. One example of such a complex problem is the rendering of three-dimensional images, which may require many calculations to determine the lighting and color applied to each pixel in the rendered image. The complexity of the problem multiplies when producing an animation that requires a number of scenes to be rendered. While a single computer may eventually carry out all the calculations required to render a single image or even a plurality of images for an animation, such calculations are usually carried out by a number of processors connected together and managed in clusters. Such connections of parallel running processors are called "rendering farms".

While large animation companies, such as Pixar, have built their own rendering farms to carry out the calculations needed in their larger animation projects (such as the making of the computer animated movie "Toy Story"), smaller animation groups or students of animation films have limited access to such systems for a number of reasons. Rendering farms have been very expensive to build and generally require a great deal of overhead costs to maintain. Smaller companies and groups have simply been unable to afford the costs of building or maintaining their own. Rendering farms have also been designed to work on a limited number of projects at a time, which makes it very difficult for smaller companies or groups to obtain access on a limited basis.

It would be advantageous to provide a system and method of rendering that is tailored to smaller projects and which could be easily tailored to provide processing power for a number of jobs at one time.

INVENTION SUMMARY

The invention provides a system and method for managing clusters of parallel processors for use by groups and individuals requiring supercomputer level computational power. Using many inexpensive computers (nodes) in a Beowulf cluster, supercomputer level processing power may be achieved. Unlike a typical Beowulf cluster, however, an embodiment of the invention uses a cluster configuration that is not static. As jobs are received from users/customers, a Resource Management Scheduling System (RMS) dynamically configures and reconfigures nodes in the system into clusters of the appropriate sizes to process the jobs.

In a preferred embodiment, a dialog takes place between the user/customer and the system prior to a job being queued to run. For example, the user/customer may choose to have the job run extremely fast at a premium cost. This is an attribute that is associated with the job. Depending on the overall size of the system, many users may have simultaneous access to supercomputer level computational processing. Users are preferably billed based on the time for completion with faster times demanding higher fees. Depending on the size of the system and the size of the jobs in the queue, jobs may be processed concurrently.

Typically, a job is submitted from a user/customer at a remote location using the Internet or another communications network. The user may also specify a time by which they would like the job completed. A fee arrangement is made and an estimated time for completion of the job is confirmed with the user. The job is placed in a queue with other jobs to be processed. A resource manager determines in what order jobs must run so that they will complete processing by the time they were promised to the user. The resource manager manipulates cluster sizes within the system dynamically; thus multiple clusters may exist and multiple jobs may be run concurrently.

The resource manager sets up a cluster by identifying the nodes to be clustered. Nodes may already be in use, so as they become available they are set aside for use in the next dynamically created cluster. A configuration file is saved to the nodes, which will serve to reconfigure the nodes into the appropriately sized cluster. The identified nodes are then soft rebooted, thus defining the cluster. The job is then run on the cluster, and the results are returned to the user.

This summary is provided so that the nature of the invention may be understood quickly. A more complete understanding of the invention may be obtained through reference to the following description of the preferred embodiments thereof in combination with the attached drawings.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

Beowulf—in general, an approach to building a supercomputer by creating a cluster of interconnected off-the-shelf personal computers.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
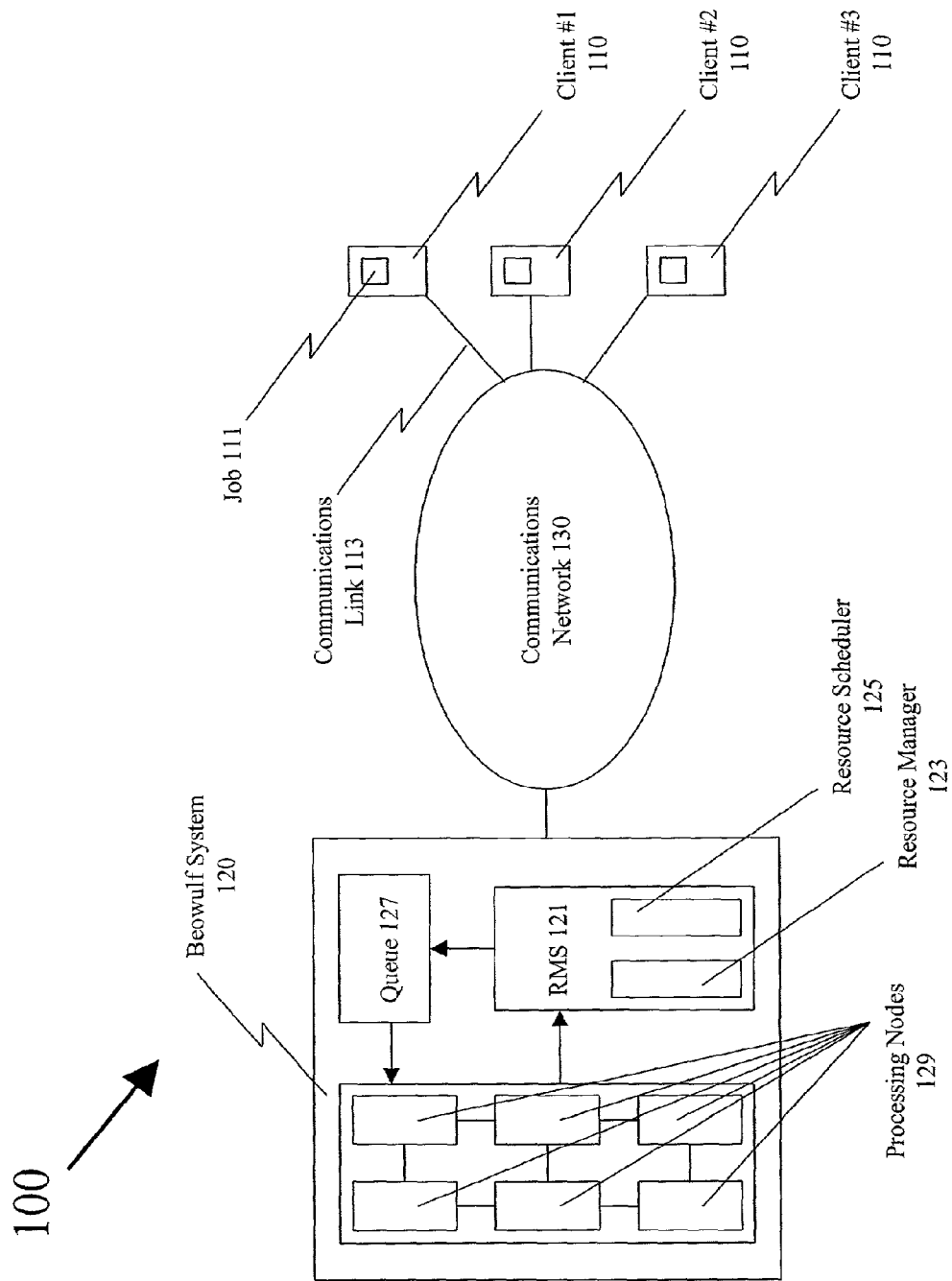
FIG. 1 shows a block diagram of a system for a dynamically allocated cluster system.

FIG. 1 shows a block diagram of a system for a dynamically allocated cluster system A system 100 includes a plurality of clients 110 (illustrated in FIG. 1 as client #1, client #2, and client #3) each associated with a user/customer, a beowulf system 120, and a communications network 130.

Each client 110 includes a processor, a main memory, and software for executing instructions. This software preferably includes software for communicating with the beowulf system according to the invention. Although the client 110 and the beowulf system 120 are shown as separate devices, there is no requirement that they be physically separate.

A job 111 includes a request for a problem to be processed by the beowulf system 120. For example, the problems to be solved may be graphics rendering, such as wireframing, preparation of polygons, lighting, and ray tracing, or engineering related problems, such as computational fluid dynamics and RF reflections on geometric models. There is no particular requirement regarding any particular computational processing uses for which the system may be used.

The communications link 113 operates to couple the client 110 and all other devices to the communications network 130.

The beowulf system 120 includes a resource management system 121, a queue 127, and a plurality of processing nodes 129. The resource management scheduling system (RMS) 121 includes a resource manager 123 and a resource scheduler 125 capable of managing system resources in accordance with the invention and explained in greater detail below. The queue 127 includes a set of jobs 111 to be executed on the processing nodes 129.

The processing nodes 129 include a plurality of processing units. In a preferred embodiment the processing units are IBM PC compatible computers; however, there is no requirement that these type of processing units be used. Other types of computers may be used and computer types may be mixed to create a heterogeneous cluster.

The communication network 130 includes at least a portion of a communication network, such as a LAN, a WAN, the Internet, an intranet, an extranet, a virtual private network, a virtual switched network, or some combination thereof. In a preferred embodiment, the communication network 120 includes a packet switched network such as the Internet, as well as (in addition to or instead of) the communication networks just noted, or any other set of communication networks that enable the elements described herein to perform the functions described herein.

System Background

The most practical system for providing parallel processing for smaller scale jobs running simultaneously is one that utilizes clusters. A cluster is a type of parallel or distributed processing system consisting of a collection of interconnected stand alone computers (called "nodes") working together as a single integrated computing resource. The individual nodes can be a single or multiprocessor system (such as a PC, a workstation, or a symmetric multiprocessor "SMP") with memory, I/O facilities, and an operating system. The nodes can exist in a single cabinet or be physically separated and connected via a LAN. A LAN-based cluster of nodes may appear as a single system to users and applications.

The more prominent features of a cluster include: high performance processors (such as PC's, workstations, or SMPs); an operating system (layered or micro-kernel based); a network system (such as an Ethernet); network interface cards; a fast communication protocol (such as Active and Fast Messaging); cluster middleware (such as a Single System Image (SSI) and System Availability Infrastructure); parallel programming environments and tools (such as compilers, PVM (Parallel Virtual Machine) and Message Passing Interface (MPI)); and applications (which may be either sequential or parallel distributed).

The cluster middleware consists primarily of hardware, an operating system or gluing layer (such as Solaris MC and GNUnix) and applications (such as Resource Management and Scheduling (RMS) software. The network interface hardware acts as a communication processor and is responsible for transmitting and receiving packets of data between cluster nodes via a network switch. The communications software provides fast and reliable data communication among the cluster nodes and to the outside world. The cluster nodes may work collectively or operate as individual processors. The cluster middleware is responsible for offering the image of a unified system and the availability of a collection of independent, yet interconnected processors.

The advantage to using clusters is that they offer high performance, expandability, high throughput and high availability at a relatively low cost. Clusters are classified into a number of categories based on various factors including the application target, the node ownership, the node hardware, the node operating system, the node configuration, and the numbers of nodes in each cluster. The application target is the purpose for which the cluster system is designed. The node ownership relates to whether the clusters are dedicated or non-dedicated.

In the case of dedicated clusters, resources are shared so that parallel computing can be performed across the entire cluster. In the case of non-dedicated clusters, the nodes are owned by individuals and applications running on the nodes may steal CPU cycles from other idle nodes. The node hardware describes whether the nodes are PCs, workstations or SMPs. Typically used operating systems include Linux, Windows NT, Solaris and others. Node configuration defines whether the clusters are homogeneous, which means that they have similar architecture and run on the same operating system, or whether they are heterogeneous and have dissimilar architecture and run on different operating systems.

The Beowulf System

While the invention described in this application may run on any cluster system, a preferred embodiment of the invention is formed using a Beowulf system. The concept for a Beowulf cluster arose from the Beowulf Project which originated at the Goddard Space Flight Center (GSFC) in the summer of 1994 with the assembly of a 16 node cluster developed for the Earth and space sciences project (ESS) by Thomas Sterling and Donald Becker.

The Beowulf system may be described as a system and method of using clusters of mass marketed PCs for performing large parallel computing tasks. Its main goal and attraction is that it provides for the maximization of the price to performance ratio. In other words, Beowulf provides a less expensive way to build and maintain the clustered nodes needed to provide supercomputer level processing power. The communication between processors in Beowulf is through TCP/IP over an Ethernet connection. It uses an extended Linux operating system to allow the loose ensemble of nodes.

Cost optimization is not the only advantage to the Beowulf system. The evolution of the Beowulf system tracks the evolution of commodity hardware and, therefore, the Beowulf system is able to incorporate the very latest technology advancements well before proprietary parallel machines. In contrast to other parallel processing systems, which require new application software to be designed for each new generation of the system, the Beowulf software programming model does not change. A first generation Beowulf program will compile and run on a fourth generation system.

Method of Operation—Resource Management Scheduling System

Figure 2:
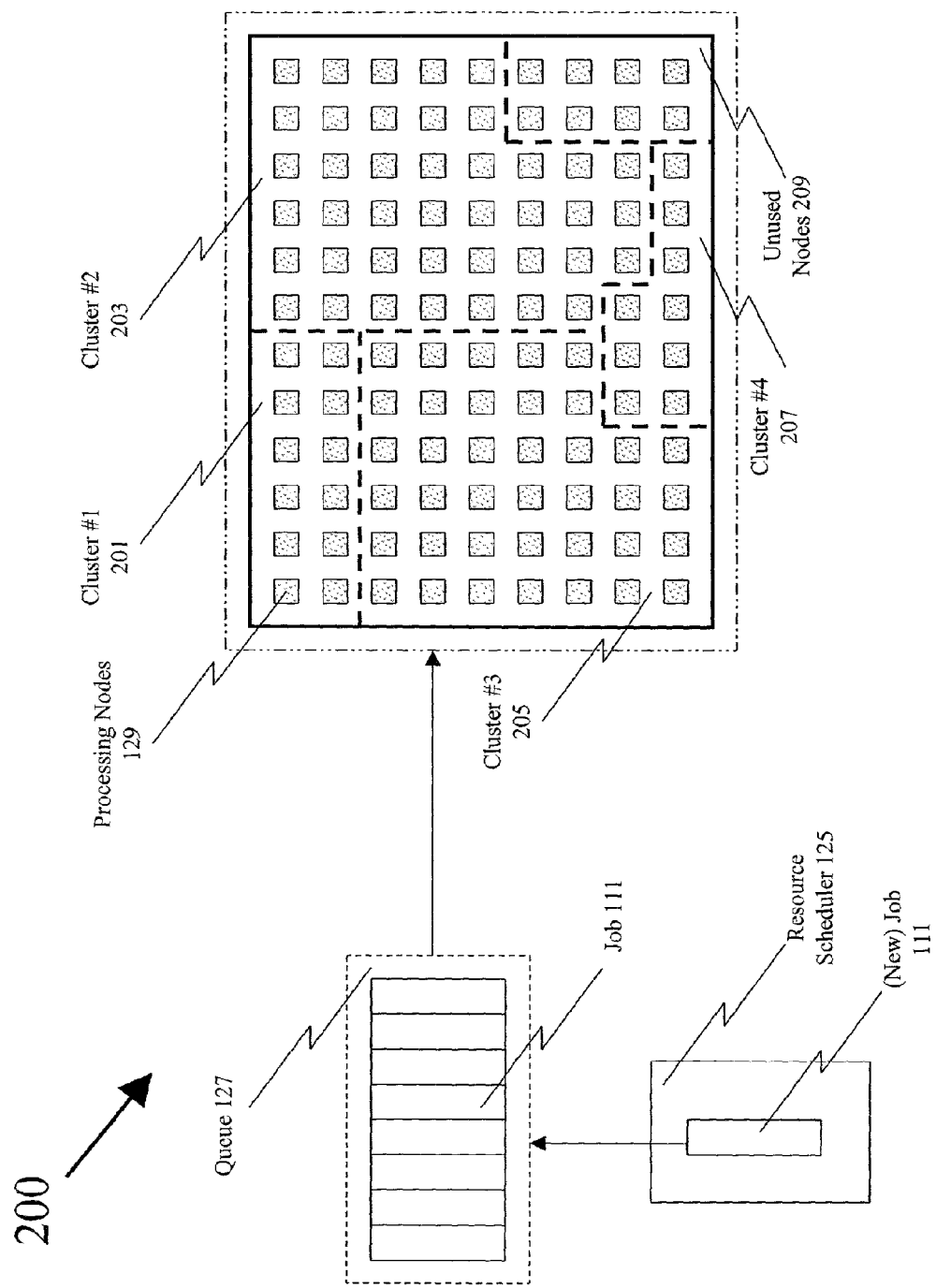
FIG. 2 shows job scheduling in a dynamically allocated cluster system. The allocation of processing nodes to clusters included herein is exemplary and in no way limiting.

FIG. 2 illustrates a Beowulf system with 108 processing nodes 129. The number of processing nodes 129 and their grouping is intended to be exemplary and not limiting. The exemplary node clusters illustrated in FIG. 2 are as follows:

Cluster #1 201 includes a cluster of 12 processing nodes 129.

Cluster #2 203 includes a cluster of 41 processing nodes 129.

Cluster #3 205 includes a cluster of 38 processing nodes 129.

Cluster #4 207 includes a cluster of 9 processing nodes 129.

Unused nodes 209 includes 8 processing nodes 129 that are currently not assigned to a cluster, thus they are available to process a job 111 that requires 8 or fewer processing nodes 129. The unused nodes 209 may also be saved and earmarked for a job 111 requiring more than 8 processing nodes 129. When a job 111 completes the processing nodes 129 are freed and become unused nodes 209.

The innovations described by the invention involve use of the RMS 121, to redefine appropriately sized clusters for certain jobs 111 within a queue 127. Generally speaking, the RMS 121 can be divided into two components, the resource manager 123 and the resource scheduler 125. The resource manager 123 is concerned with tasks such as locating and allocating the computational resources (the processing nodes 129) to the job 111. This can also be described as the task of configuring the processing nodes 129 into clusters large enough to process a particular job 111.

The resource scheduler 125 is involved with scheduling the jobs 111 for processing. This includes management of the queue 127. Multiple queues 127 can be set up to handle different job 111 priorities. For example, certain users may have priority to run a short job 111 before a long job 111. Queues 127 can also be set up to manage the usage of specialized resources, such as a parallel computing platform or a high performance graphics workstation.

A (new) job 111 received from a client 110 is handled first by the RMS 121. The resource scheduler 125 places the (new) job 111 into the queue 127. The job 111 is tagged with the time at which it must be completed. The resource manager 123 looks at the first job 111 in the queue 127 and determines whether there are enough processing nodes 129 available to run the job 111. If there are enough processing nodes 129 to run a job 111, the job 111 can be run, however, if there are insufficient processing nodes 129 to run a job, the resource manager must start reserving processing nodes 129 as they become available from jobs 111 that are completing.

Smart scheduling may be enabled which allows the RMS 121 to determine whether a job 111 in the queue 127 can run using the available processing nodes 129 and complete prior to (or within a reasonable tolerance time before) the required number of processing nodes 129 becoming available to run the job 111 at the front of the queue 127. The system operator can define the tolerance time that the system will not exceed. A customer may be queried prior to submitting a job 111 to see if they are willing to accept a tolerance time for a fee discount. The RMS 121 can then take advantage of the tolerance time to assist in the best possible use of system resources.

Figure 3:
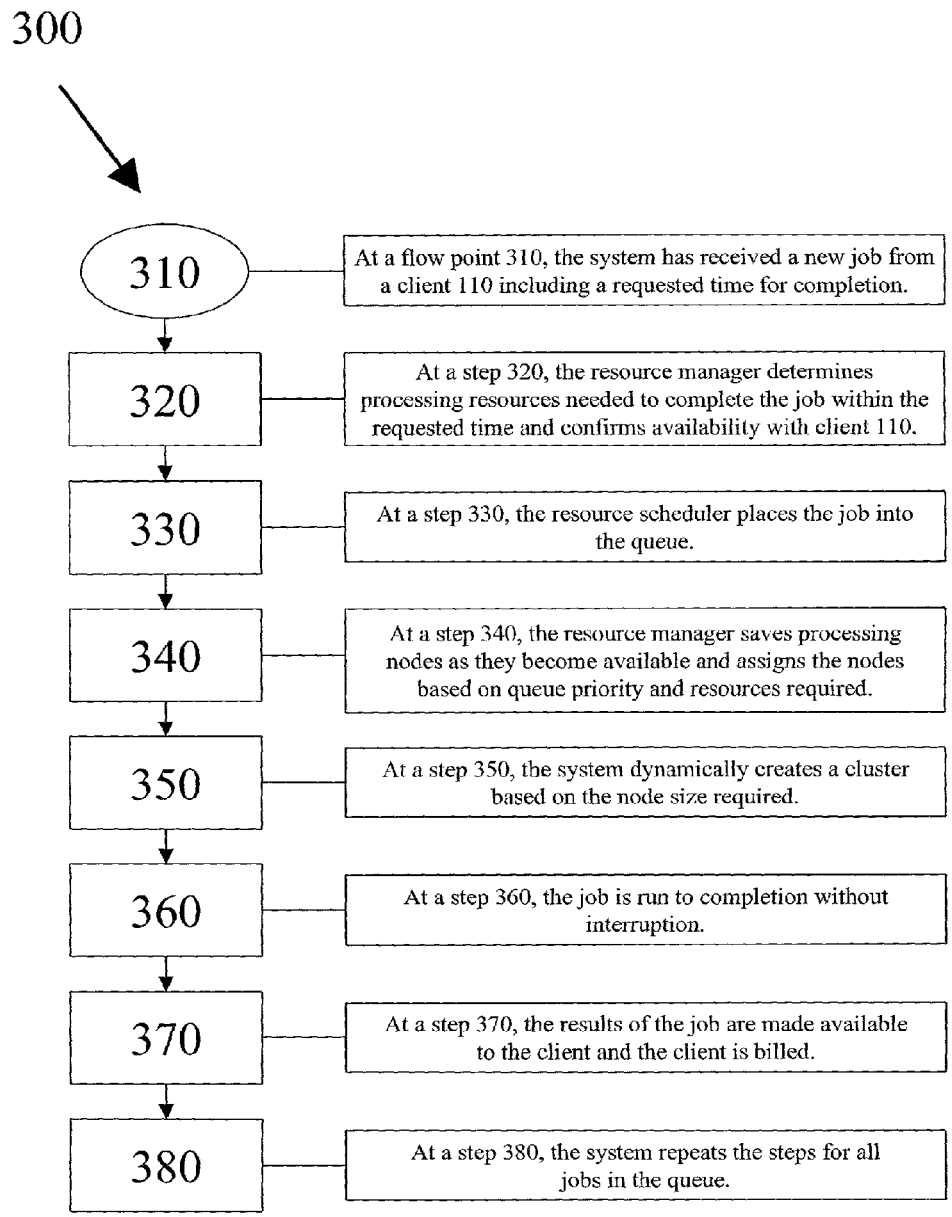
FIG. 3 shows a process flow diagram of a job in a dynamically allocated cluster system.

FIG. 3 shows a process flow diagram of a job in a dynamically allocated cluster system. The method 300 is performed by the system 100. Although the method 300 is described serially, the steps of the method 300 can be performed by separate elements in conjunction or in parallel, whether asynchronously, in a pipelined manner, or otherwise. There's no particular requirement that the method 300 be performed in the same order in which this description lists the steps, except were so indicated.

At a flow point 310, the client 110 connects to the beowulf system 120 via the communications network 130 and communications link 113. The system receives a (new) job 111 from a client 110. Generally, the job 111 will include a requested time for completion. A dialog occurs between the beowulf system 120 and the client 110 regarding the parameters and attributes of the job 111 to be processed. A dialog of this nature is well-known in the art for conducting ecommerce and/or information exchange. In a preferred embodiment, a "forms" type system is used to collect information about the job 111 from the client 110, however, the invention is not restricted to this method of collecting data.

Basic demographic information may be collected from the client 110 to assist with identifying ownership of the job 111 and billing for the services provided. The client 110 also selects the type of service they need for processing the job 111. A system may be established and specialize in only one type of processing, such as graphics rendering. Other systems may be established to service many different types of jobs 111. In the later case, the client 110 must choose the type of service they desire.

Generally, the cost for processing a job 111 is based on the computer time used. This may be calculated by multiplying the time for completing the job 111 by the number of processing nodes 129 clustered to service the job 111. A host of other attributes may be applied to pricing, including sliding scales based on the number of processing nodes 129 in a cluster—the larger the cluster, the greater the cost per node or vice-versa. Minimum charges and flat fees may also apply, as would an extra cost for scheduling a job to a higher priority in the queue 127.

At a step 320, the resource manager 123 of the RMS 121 determines the processing resources needed to complete the job by the time requested by the client 110. The client 110 is contacted to provide confirmation that the job 111 will be processed by the time requested, or to inform the client 110 that the job 111 will not be completed until a later time. The job 111 may in fact be completed prior to the time requested.

At a step 330, the resource scheduler 125 places the job 111 into the queue 127. In a preferred embodiment, a (new) job 111 will be placed at the end of the queue, however, a job 111 may be placed anywhere within the queue 127 at the discretion of the resource scheduler 125.

At a step 340, the resource manager of the RMS 121 saves processing nodes 129 as they become available. The resource scheduler 125 is capable of smart scheduling of jobs 111. For example, the next job 111 in the queue 127 may require 50 processing nodes 129. The resource manager 123 may have already reserved 30 processing nodes 129 to service the job 111 and needs 20 more. The resource scheduler 125 maintains a list of all running jobs and their estimated time of completion. If a smaller job 111 is waiting in the queue that requires 30 or fewer processing nodes 129, and the smaller job 111 can be completed before the 20 processing nodes 129 become available to total the 50 needed for the larger job 111, the reserved processing nodes 129 can be temporarily used to service the smaller job 111 (smart scheduling).

At a step 350, sufficient processing nodes 129 have been reserved for a job 111. The system saves a configuration file on the reserved processing nodes 129. The processing nodes 129 are now soft rebooted, and the configuration file serves to initialize and reconfigure each processing node 129 into part of a newly formed cluster.

At a step 360, the job 111 is run to completion on the newly formed cluster without interruption.

At a step 370, the results of the job 111 made available to the client 110 and the client is billed. At this point, the processing nodes 129 used to process the job 111 are free to be used as part of another dynamically sized cluster. In a preferred embodiment, the client is sent a notification that the job 111 has run to completion and the results are available to be retrieved at the convenience of the client 110. In an alternative embodiment, the results are delivered directly to the client 110 as previously specified by the client 110 when ordering the service.

At a step 380, the system repeats the steps above for all jobs 111 in the queue 127.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A computer-implemented method, comprising:
receiving a first job to be processed by a first dynamic cluster of processing resources, the first job having a predetermined completion time requirement;
receiving processing information from a pool of processing resources, said processing information including at least completion times for each processing resource that is currently executing a job;
determining the first dynamic cluster of processing resources from the pool of processing resources to execute the first job in the future in response to the predetermined completion time requirement and the completion times of the processing resources that are currently executing a job;
receiving a second job to be processed by a second dynamic cluster of processing resources, the second job requiring different overall processing resources relative to the first job;
determining the second dynamic cluster of processing resources to complete execution of the second job, the second dynamic cluster of processing resources differing in composition from the first dynamic cluster of processing resources while at least one of the processing resources of the second dynamic cluster of processing resources is also reserved for the first job in the first dynamic cluster of processing resources; and
enqueueing the first job to complete execution prior to starting execution of the second job, the second job completing execution prior to a predetermined completion time requirement for the second job.

2. The method of claim 1 further comprising:
configuring the first and second dynamic cluster of processing resources by transmitting a configuration file to each processing resource, wherein each processing resource dynamically configures into a cluster.

3. The method of claim 1 wherein said enqueueing includes:
maintaining one or more queues of jobs to be processed;
maintaining processing times for each job in said queue of jobs;
adding jobs to the queue of jobs in response to said processing time and a completion time requirement for each added job.

4. The method of claim 3 further including:
reordering at least one of queues of jobs wherein jobs are enqueued to meet the completion time requirement.

5. The method of claim 1 wherein said enqueueing includes:
maintaining a plurality of queues of jobs to be processed wherein each queue operates at a different job priority.

6. The method of claim 1 further including:
receiving a tolerance time for each job to be processed;
wherein said enqueueing is in response to said tolerance time.

7. The method of claim 1, further comprising:
adjusting a duration of the predetermined completion time requirement and the first dynamic cluster of processing resources in accordance with a set of fees.

8. The method of claim 1, wherein at least one of the first and second job comprises a graphics rendering job.

9. One or more non-transitory processor readable storage devices having non-volatile and non-transitory processor readable code embodied on said storage devices, said processor readable code for programming one or more processors to perform a method comprising:
receiving a first job to be processed by a first dynamic cluster of processing resources, the first job having a predetermined completion time requirement;
receiving processing information from a pool of processing resources, said processing information including at least completion times for each processing resource that is currently executing a job;
determining the first dynamic cluster of processing resources from the pool of processing resources to execute the first job in the future in response to the predetermined completion time requirement and the completion times of the processing resources that are currently executing a job;
receiving a second job to be processed by a second dynamic cluster of processing resources, the second job requiring different overall processing resources relative to the first job;
determining the second dynamic cluster of processing resources to complete execution of the second job, the second dynamic cluster of processing resources differing in composition from the first dynamic cluster of processing resources while at least one of the processing resources of the second dynamic cluster of processing resources is also reserved for the first job in the first dynamic cluster of processing resources; and
enqueueing the first job to complete execution prior to starting execution of the second job, the second job completing execution prior to a predetermined completion time requirement for the second job.

10. The device of claim 9 wherein the method further comprises:
configuring the first and second dynamic cluster of processing resources by transmitting a configuration file to each processing resource, wherein each processing resource dynamically configures into a cluster.

11. The device of claim 9 wherein said enqueueing includes:
maintaining one or more queues of jobs to be processed;
maintaining processing times for each job in said queue of jobs;
adding jobs to the queue of jobs in response to said processing time and a completion time requirement for each added job.

12. The device of claim 11 wherein said method further includes:
reordering at least one of said queues of jobs wherein jobs are enqueued to meet the completion time requirement.

13. The device of claim 9 wherein said enqueueing includes:
maintaining a plurality of queues of jobs to be processed wherein each queue operates at a different job priority.

14. The device of claim 9 wherein the method further includes:
receiving a tolerance time for each job to be processed;
wherein said enqueueing is in response to said tolerance time.

15. The method of claim 9, further comprising:
adjusting a duration of the predetermined completion time requirement and the first dynamic cluster of processing resources in accordance with a set of fees.

16. The method of claim 9, wherein at least one of the first and second job comprises a graphics rendering job.

17. A hardware device, with a resource management system, the hardware device comprising:
a processor; and
a memory, storing:
a queue to receive a first job to be processed by a first dynamic cluster of processing resources, the first job having a predetermined completion time requirement;
a resource manager to receive processing information from a pool of processing resources, said processing information including at least completion times for each processing resource that is currently executing a job, the resource manager to determine the first dynamic cluster of processing resources from the pool of processing resources to execute the first job in the future in response to the predetermined completion time requirement and the completion times of the processing resources that are currently executing a job,
wherein the queue receives a second job to be processed by a second dynamic cluster of processing resources, the second job requiring different overall processing resources relative to the first job,
wherein the resource manager determines the second dynamic cluster of processing resources to complete execution of the second job, the second dynamic cluster of processing resources differing in composition from the first dynamic cluster of processing resources while at least one of the processing resources of the second dynamic cluster of processing resources is also reserved for the first job in the first dynamic cluster of processing resources; and
a resource scheduler to queue the first job to complete execution prior to starting execution of the second job, the second job completing execution prior to a predetermined completion time requirement for the second job.

* * * * *